US009580611B2

(12) United States Patent
Albayrak et al.

(10) Patent No.: US 9,580,611 B2
(45) Date of Patent: Feb. 28, 2017

(54) COATING COMPOSITION FOR ELECTRICAL CONDUCTORS AND METHOD OF PRODUCING SUCH A COMPOSITION

(75) Inventors: Sener Albayrak, Saarbruecken (DE); Carsten Becker-Willinger, Saarbruecken (DE); Michael Veith, Ingbert (DE); Oral Cenk Aktas, Saarbruecken (DE)

(73) Assignee: Leibniz-Institut fuer neue Materialien gemeinnuetzige Gesellschaft mit beschraenkter Haftung, Saarbruecken (DE)

( * ) Notice: Subject to any disclaimer, the term of this patent is extended or adjusted under 35 U.S.C. 154(b) by 0 days.

(21) Appl. No.: 12/310,707

(22) PCT Filed: Sep. 4, 2007

(86) PCT No.: PCT/DE2007/001569
§ 371 (c)(1),
(2), (4) Date: Mar. 23, 2009

(87) PCT Pub. No.: WO2008/028471
PCT Pub. Date: Mar. 13, 2008

(65) Prior Publication Data
US 2010/0063194 A1 Mar. 11, 2010

(30) Foreign Application Priority Data
Sep. 4, 2006 (DE) .................. 10 2006 041 738

(51) Int. Cl.
| *C08G 77/24* | (2006.01) |
| *C08L 75/00* | (2006.01) |
| *C08K 3/22* | (2006.01) |
| *H01B 3/10* | (2006.01) |
| *C09D 7/12* | (2006.01) |
| *H01B 3/00* | (2006.01) |
| *C08K 3/30* | (2006.01) |
| *C08K 9/04* | (2006.01) |
| *C08K 9/08* | (2006.01) |

(52) U.S. Cl.
CPC ........... *C09D 7/1225* (2013.01); *C09D 7/1266* (2013.01); *C09D 7/1275* (2013.01); *H01B 3/006* (2013.01); *C08K 3/22* (2013.01); *C08K 3/30* (2013.01); *C08K 9/04* (2013.01); *C08K 9/08* (2013.01)

(58) Field of Classification Search
CPC ............... C08G 77/24; C08G 77/42; C08L 75/04–75/16; H01B 3/302; H01B 3/308; H01B 3/105
USPC ............. 523/213; 524/401–437; 423/594.14; 427/117
See application file for complete search history.

(56) References Cited
U.S. PATENT DOCUMENTS

| 4,464,701 A * | 8/1984 | Roberts et al. ............... 361/313 |
| 4,521,549 A | 6/1985 | Penneck |
| 4,571,361 A * | 2/1986 | Kawaguchi et al. ......... 428/328 |
| 5,644,014 A * | 7/1997 | Schmidt et al. ............... 528/43 |
| 5,917,155 A * | 6/1999 | Hake et al. ............... 174/120 R |
| 6,287,691 B1 * | 9/2001 | Decaumont et al. ......... 428/379 |
| 6,306,543 B1 * | 10/2001 | Vinson ....................... 429/231.5 |
| 6,336,026 B1 * | 1/2002 | Heeks et al. .................. 399/302 |
| 6,497,964 B1 * | 12/2002 | Matsumura .............. C09D 4/00 106/287.1 |
| 6,524,750 B1 * | 2/2003 | Mansuetto .................... 429/232 |
| 6,642,297 B1 * | 11/2003 | Hyatt et al. ................... 524/492 |
| 6,881,529 B2 * | 4/2005 | Iwasaki ........................ 430/166 |
| 6,908,692 B1 * | 6/2005 | Bohm et al. .................. 428/632 |
| 7,737,488 B2 * | 6/2010 | Lai et al. ...................... 257/325 |

(Continued)

FOREIGN PATENT DOCUMENTS

| EP | 1 166 283 | 1/2002 | |
| JP | 2004307735 A * | 11/2004 | ............. C08F 20/10 |

(Continued)

OTHER PUBLICATIONS

Kaur, R., Singh, A.V., Mehra, R.M. Phys. Stat. Sol. (a), vol. 202, No. 6, p. 1053-1059, 2005.*
Manoj, P.K., et al. Ceramics International, vol. 33, p. 273-278, 2007.*
Pomfret, M.B., Stolz, C., Varughese, B., Walker, R.A. Anal. Chem., vol. 77, p. 1791-1795, 2005.*
Gonzalez (Dielectric data of Zn-doped alumina materials obtained from different precursor powders. Key Engineering Materials. vol. 206-213, 2002, pp. 1333-1336.*
Wu (Giant Dielectric Permittivity Observed in Li and Ti Doped NiO. Physical Review Letters. 89(21), 2002, 4 pages).*
Loong (A laser spectroscopic study of Nd-doped zirconia. Journal of Alloys and Compounds, 250, 1997, pp. 352-355).*
Haering (Degradation of the electrical conductivity in stabilized zirconia systems Part I: yttria-stabilised zirconia. Solid State Ionics. 176, 2005, pp. 253-259).*

(Continued)

*Primary Examiner* — Brieann R Fink
(74) *Attorney, Agent, or Firm* — Collard & Roe, P.C.

(57) ABSTRACT

The aim of the invention is to create a composition for coating electric conductors which is significantly more resistant to partial discharges than prior art compositions while the produced insulating layer is highly extensible. Said aim is achieved by a composition comprising 1 to 50 percent by weight of microparticles that have a specifically adjusted electronic defect structure in the crystal lattice, resulting in greater polarizability of the valence electrons, and an organic and/or organic-inorganic matrix. The microparticles that have a specifically adjusted electronic defect structure are composed of oxides, sulfides, selenides, tellurides of the elements which are part of the series encompassing silicon, zinc, aluminum, tin, boron, germanium, gallium, lead, the transition metals, lanthanides, and actinides, particularly from the series encompassing silicon, titanium, zinc, yttrium, cerium, vanadium, hafnium, zirconium, nickel, and/or tantalum, in such a way that the basic lattice is provided with vacant lattice positions by doping 4 the basic lattice with adequate low-valent or higher-valent elements, said vacant lattice positions increasing the electronic polarizability of the microparticles by means of defect chemistry (the defect structure).

9 Claims, No Drawings

(56) References Cited

U.S. PATENT DOCUMENTS

| | | | |
|---|---|---|---|
| 2003/0099488 A1* | 5/2003 | Tanaka | G03G 5/14704 |
| | | | 399/176 |
| 2006/0035087 A1* | 2/2006 | Yadav et al. | 428/411.1 |
| 2006/0083936 A1* | 4/2006 | Higuchi | C08G 77/50 |
| | | | 428/447 |
| 2006/0089442 A1* | 4/2006 | Mennig et al. | 524/430 |
| 2007/0116976 A1* | 5/2007 | Tan et al. | 428/546 |
| 2007/0155882 A1* | 7/2007 | Yamaguchi et al. | 524/409 |
| 2007/0205477 A1* | 9/2007 | Yokoyama | 257/429 |
| 2008/0008838 A1* | 1/2008 | Arpac et al. | 427/386 |
| 2010/0119697 A1* | 5/2010 | Baran, Jr. | 427/8 |
| 2010/0200814 A1* | 8/2010 | Marui et al. | 252/500 |

FOREIGN PATENT DOCUMENTS

| | | | | |
|---|---|---|---|---|
| WO | WO 96/42089 | 12/1996 | | |
| WO | WO 2004/090053 | 10/2004 | | |
| WO | WO 2008028471 A1 * | 3/2008 | | C09D 7/1225 |

OTHER PUBLICATIONS

Gnedenkov (Nanostructured Zirconia-Doped Titania as the Anode Material for Lithium-Ion Battery. Russian Journal of Inorganic Chemistry, 2015, 60(6), pp. 658-664).*

International Search Report.

* cited by examiner

COATING COMPOSITION FOR ELECTRICAL CONDUCTORS AND METHOD OF PRODUCING SUCH A COMPOSITION

CROSS REFERENCE TO RELATED APPLICATIONS

This application is the National Stage of PCT/DE2007/001569 filed on Sep. 4, 2007, which claims priority under 35 U.S.C. §119 of German Application No. 10 2006 041 738.0 filed on Sep. 4, 2006. The international application under PCT article 21(2) was not published in English.

The invention relates to a composition for coating electrical conductors and a method of producing such a composition.

Metallic wires made, e.g., of copper or aluminum find wide use as windings in electric motors, 3-phase a.c. motors, transformers and so on. The surface of the wires is provided with an electrical insulation coating in order to insulate the individual turns of the wire from each other and prevent a short circuit, which would make using the wire as a coil impossible. Low-to-medium-power variable speed motors, for example, are mostly realized with pulse-controlled a.c. converters. Under these conditions, the resulting electrical load acting on the insulation is even substantially greater than under mains operation. During switching operations, voltage peaks of up to three times the terminal voltage may be encountered. These cause transient temperatures of up to 350° C. in the insulation, which can damage the organic-based polymer structure. If the thermal load causes the insulation material to erode completely at any one point by way of constant partial discharges, the breakdown that occurs immediately at this point leads to complete failure of the interturn insulation.

In order to remain undamaged by high-voltage loads or pulse-shaped voltage loads caused, e.g., by pulsed a.c. voltages, the insulation layers of the wire windings must therefore meet the stringent requirements in respect of electrical and thermal endurance. In addition, the insulation layers must demonstrate high scratch resistance, high adhesive strength, high resistance to scraping and high abrasion resistance. They must also be sufficiently flexible, i.e., the insulation coating must not tear during bending and associated extension of the wires during downstream processing.

It has already been described in the WO 96/42089 A1 that for the special application of electric motors driven by a pulse-controlled a.c. converter, the use of (sub)-micrometer-range inorganic oxidic particles in polymeric enamel binders can increase partial-discharge resistance and hence improve the system's reliability. The basic disadvantage of the system compositions described there consists in the fact that the particulate oxidic phase is not bonded to the matrix. The non-bonded particles reduce the strength of the insulation layer and facilitate the formation of cracks therein during the extension incurred by the downstream winding process. The premature formation of cracks leads to flaws manifested as a significant reduction in partial-discharge resistance. For this reason, a multi-layer coating is described in which each oxide-filled layer has an unfilled layer superimposed upon it in order to minimize the tendency for cracks to be initiated from the top side of the insulation layer. The need for several layers of different materials increases production costs and is therefore a disadvantage.

By contrast, the EP 1 166 283 B1 discloses a composite coating composition for metallic conductors, which is used in a single-layer or multi-layer application and does not have the aforementioned drawback of reduced partial-discharge resistance caused by reduced extensibility. The description focuses on a coating composition which contains 1-60 wt. % of oxidic particles, 0-90 wt. % of one or more conventional binders, and 0-95 wt. % of one or more conventional additives, solvents, pigments and/or fillers. The oxidic particles are based on an element-oxygen network with elements of the series comprising aluminum, tin, boron, germanium, gallium, lead, the transition metals and the lanthanides and actinides, particularly of the series comprising silicon, titanium, zinc, yttrium, cerium, vanadium, hafnium, zirconium, nickel and/or tantalum, and are bonded to the binder matrix. Thanks to this bonding, the extensibility of the insulation layers produced is at least only slightly reduced compared to the unfilled polymer matrix. As a result, sufficiently flexible coatings with good surface quality are obtained even in a single-layer application. The particles have an average diameter of 1-300 nm. They improve the partial-discharge resistance and hence the electrical service life of the insulating enamel coating even when subjected to extension. However, particulate modification does not produce a disproportionate increase in the partial-discharge resistance, so that, in turn, relatively high particle contents in the range of 30 wt. % have to be used in order to actually achieve the desired high-level electrical insulation properties.

The object of this invention is accordingly to provide a coating composition for electrical conductors, the partial-discharge resistance of which coating composition is increased significantly compared with prior-art solutions while the isolation or insulation layer produced remains highly extensible. A further aim is to simultaneously improve the thermal and mechanical properties of the enamel layers produced.

This object is established by a coating composition for electrical conductors, said coating consisting of
1-50 wt. % of microparticles with a selectively adjusted electronic defect structure in the crystal lattice, said defect structure making the valence electrons more easily polarizable, and
an organic and/or organic-inorganic matrix,
the microparticles with the selectively adjusted electronic defect structure being made up of oxides, sulfides, selenides and/or tellurides of elements of the series comprising silicon, zinc, aluminum, tin, boron, germanium, gallium, lead, the transition metals and the lanthanides and actinides, particularly of the series comprising silicon, titanium, zinc, yttrium, cerium, vanadium, hafnium, zirconium, nickel and/or tantalum in such manner that, by means of doping with appropriate lower- or higher-valency elements, the basic crystal lattice is provided with vacancies which, by way of defect chemistry (defect structure), make it easier for the microparticles to be electronically polarized.

Compared with the compositions known until now, the insulation layers obtained with the coating composition of the invention ensure a disproportionately increased partial-discharge resistance, as a result of which continuous loading under the influence of high voltages, especially pulse-shaped voltages, combined simultaneously with elevated temperatures becomes possible. They show clearly increased electrical loading capacity and a significantly longer service life compared with composite compositions containing particles without defect chemistry. Coatings made in this way also show lower surface energy.

Aside from increased partial-discharge resistance, the isolation or insulation layers obtained with the coating compositions of the invention furthermore show excellent adhesion, high abrasion resistance, a high level of hardness and flexibility and good surface quality.

In addition, it was found that the composition of the invention can be used at high temperatures (e.g. 300° C.) and maintain the described mode of functioning at these temperatures.

In summary, a composition of a polymeric matrix and overvoltage-minimizing metal-oxide particles is provided for use as insulation for electrical conductors such as metal wires, having a clearly disproportionately increased electrical service life (clearly improved partial-discharge resistance) combined with simultaneously increased thermal stability and improved mechanical properties (abrasion resistance, strength and flexibility).

A preferred embodiment of the invention provides for the organic and/or organic-inorganic matrix to include one or more polymerizable and/or hybrid binders.

A further development of the invention consists in that the composition contains one or more of the substances from the group consisting of additives, polymerization initiators, solvents, pigments and/or fillers.

Provision is also made for the use of doping elements in an amount up to 0.5-15 mol. %, preferably 1-10 mol. %, even more preferably 2-8 mol. %.

It is within the scope of the invention that the average particle diameter of the microparticles with an electronic defect structure is 1-1,000 nm.

It is likewise within the scope of the invention that the microparticles contain reactive surface groups adapted to the polymer-based and/or hybrid binders.

In this connection, it is expedient that the reactive surface groups are selected from the group comprising metal acid esters, cyanate groups, urethane groups, epoxide groups, epoxy, carboxylic acid anhydride, C=C double bond systems, hydroxyl groups, alcohols bound by way of oxygen, esters, ethers, chelating agents, carboxyl groups, amino groups, ammonium and/or reactive resin components, the polymer-based binders containing acrylate groups, phenol groups, melamine groups, polyester-polyester imide groups, polysulfide groups, epoxide or polyamide groups, polyvinyl formal resins, aromatic compounds, aliphatic compounds, esters, ethers, alcoholates, fats or chelating agents.

It is within the scope of the invention that the composition is transparent.

Since it is possible to develop a composition according to the invention which is transparent, it is possible to use this also in the field of optics, e.g. in display technology.

The invention furthermore provides for the composition to contain a fluorine compound.

One embodiment of the invention consists in that the composition contains organically modified inorganic condensates.

According to a further embodiment, the composition contains a fluorinated silane, its pre-condensate or condensate.

The scope of the invention also includes a method of producing a coating for electrical conductors, in which
  1-50 wt. % of microparticles with a selectively adjusted electronic defect structure in the crystal lattice, said defect structure making the valence electrons more easily polarizable, and
  an organic and/or organic-inorganic matrix
are dispersed, the microparticles with the selectively adjusted electronic defect structure being made up of oxides, sulfides, selenides and/or tellurides of elements of the series comprising silicon, zinc, aluminum, tin, boron, germanium, gallium, lead, the transition metals and the lanthanides and actinides, particularly of the series comprising silicon, titanium, zinc, yttrium, cerium, vanadium, hafnium, zirconium, nickel and/or tantalum in such manner that, by means of doping with appropriate lower- or higher-valency elements, the basic crystal lattice is provided with vacancies which, by way of defect chemistry (defect structure), make it easier for the microparticles to be electronically polarized.

In this connection, it is within the scope of the invention that the organic and/or organic-inorganic matrix includes one or more polymerizable and/or hybrid binders.

According to the invention, one or more of the substances from the group consisting of additives, polymerization initiators, solvents, pigments and/or fillers are added.

The invention provides for the use of doping elements in an amount up to 0.5-15 mol. %, preferably 1-10 mol. %, even more preferably 2-8 mol. %.

It is also expedient that the average particle diameter of the microparticles with an electronic defect structure is 1-1,000 nm.

It may also be to advantage that the electronic defect structure of the microparticles is adjusted by means of ion-beam and/or electron-beam treatment.

It is likewise within the scope of the invention that the microparticles contain reactive surface groups adapted to the polymer-based and/or hybrid binders.

In this connection, the invention provides for the reactive surface groups to be selected from the group comprising metal acid esters, cyanate groups, urethane groups, epoxide groups, epoxy, carboxylic acid anhydride, C=C double bond systems, hydroxyl groups, alcohols bound by way of oxygen, esters, ethers, chelating agents, carboxyl groups, amino groups, ammonium and/or reactive resin components, the polymer-based binders containing acrylate groups, phenol groups, melamine groups, polyester-polyester imide groups, polysulfide groups, epoxide or polyamide groups, polyvinyl formal resins, aromatic compounds, aliphatic compounds, esters, ethers, alcoholates, fats or chelating agents.

The coating's mechanical properties (e.g. module of elasticity) can be influenced by the selection of polymerizable or non-polymerizable surface groups.

On the basis of a composition in which yttrium-doped zirconium dioxide is used, the underlying mechanisms of this invention for increased polarizability via an electronic defect structure in the microparticles' crystal lattice are assumed to be as follows, although this is only a supposition: When zirconium is doped with yttrium, lattice sites in the tetravalent zirconium are occupied statistically by trivalent yttrium. Oxygen vacancies not present in undoped zirconium dioxide are generated in the crystal lattice as a result, giving it what is called a defect structure. The selectively generated defect structure is ultimately what causes the strong increase in the valence electrons' polarizability. The increased polarizability facilitates the shifting of electric charges within the system, this being manifested as enhanced diffusion polarization of the charges in the microparticles' crystal structure. In conjunction with the polymeric binder, the enhanced diffusion polarization in the microparticles leads to the formation of electrically active centers via the microparticles themselves, which are separated from each other by a highly isolating or insulating binder matrix with a low dielectric constant.

Since the microparticles have a very small diameter and are finely dispersed throughout the binder matrix, the insulation layer contains very many active centers with enhanced polarizability; these effectively delocalize the otherwise highly localized electrical voltage peaks occurring in the insulation layer. As a result, fewer critical overvoltages occur in the (thermally less stable) insulating binder phase. These would cause localized damage and premature failure of the insulation. This mechanism is considered to be the cause of the distinctly enhanced partial-discharge resistance and of the disproportionately high increase in the electrical service life of the composition according to the invention.

The following examples show the effects of selective defect chemistry in the microparticles on the electrical properties of the insulation materials.

To this end, copper sheets were coated with unfilled polyurethane enamel, $Y_2O_3$-doped polyurethane and undoped $ZrO_2$. The layer thickness of the samples was about 20 μm. The dielectric properties were determined in an alternating field by measuring the capacity of the samples at a frequency of 50 Hz, a voltage of Vpp=100 V and a temperature of T=20° C. In addition, the average field strengths were measured at which partial discharges below a certain threshold voltage first occurred. The results are shown in the following table.

TABLE

Dielectric constants and partial discharges of polyurethane-based insulation layers containing $ZrO_2$ microparticles with and without defect chemistry compared with unfilled polyurethane matrix

| Polyurethane enamel (PU) | Concentration of doped $ZrO_2$ relative to the overall composition | Concentration of undoped $ZrO_2$ relative to the overall composition | Dielectric constant | Average field strength for an initial partial discharge |
|---|---|---|---|---|
| PU 1 | 0 vol. % | 0 vol. % | 4.4 | 118 kV/mm |
| PU 2 | 5 vol. % | 0 vol. % | 5.6 | 130 kV/mm |
| PU 3 | 10 vol. % | 0 vol. % | 6.6 | 140 kV/mm |
| PU 4 | 0 vol. % | 5 vol. % | 3.1 | 65 kV/mm |
| PU 5 | 0 vol. % | 10 vol. % | 3.5 | 75 kV/mm |

On account of the existence in the doped microparticles of a defect structure that causes an increase in the diffusion polarization of the charges, a high dielectric constant is obtained, which contrasts with that obtained for undoped microparticles. The ultimate effect of this is that partial discharges occurring in the insulation due to application of an external alternating electric field are evened out again. As a result, the partial discharges are unable to reach a critical size and the formation of partial-discharge paths (treeing) is prevented. This, in turn, leads ultimately to the observed disproportionately high improvement in the electrical service life of the composition according to the invention.

This increase in the partial-discharge resistance of the composite containing $ZrO_2$ microparticles with a defect structure is reinforced further by elevated temperature, as is illustrated by the following examples.

The metal sheets coated with unfilled polyurethane and polyurethane containing $Y_2O_3$-doped and undoped $ZrO_2$ were heated to 170° C. The samples were subsequently exposed to the alternating electric field and the current flow (leakage current) measured, which for its part, in an inversely proportional relation, is a measure of the quality of the insulating properties of the particular coatings. The composite samples containing doped $ZrO_2$ showed a lower leakage current than did the samples containing undoped $ZrO_2$ particles ($I_{PU}$=33 μA, $I_{PU-ZrO2-undoped}$=60 μA, $I_{PU-ZrO2-doped}$=8.3 μA). This is an indication that the diffusion polarization of the charge carriers in the composites with a defect structure is further increased by high temperature, as a result of which the partial discharges caused by the electric field can be evened out further. This leads to the already measured lower leakage current. Thus, these results, too, demonstrate that the microparticles with a defect structure lead to an increase in the electrical service life of the insulation layers.

EXAMPLE 1

Reference Insulation Enamel

Commercially available polyurethane resin was used as reference insulation enamel. PU resin contains the components polyester polyols and blocked isocyanate crosslinkers. The solids content is about 25 wt. %.

EXAMPLE 2

Preparation of $ZrO_2$ Microparticle Sol from Undoped $ZrO_2$ Particles

Undoped $ZrO_2$ particles were prepared via a controlled growing process at high pressure and high temperatures (hydrothermal process). To this end, 3,200 g of Zr-n-propylate was precipitated in controlled manner with appropriate additives and was treated in an autoclave at T=270° C. and 80 bar for 5 h. The powder cake made in this way was subsequently freeze-dried. The powder was then surface-modified in ethanol with trioxadecanoic acid. Approximately 1 kg of undoped $ZrO_2$ was dispersed into this mixture. The whole suspension was subsequently homogenized for about 5 h under continuous grinding with $ZrO_2$ grinding balls. Surface-modified, undoped $ZrO_2$ microparticles are obtained.

EXAMPLE 3

Preparation of $ZrO_2$ Microparticle Sol from Doped $ZrO_2$ Microparticles

Doped $ZrO_2$ microparticles were made via a hydrothermal process in a manner analogous to that of Example 2. To this end, 230 g of yttrium nitrate (Y-nitrate) were dispersed as doping agent in 3,200 g of Zr-n-propylate. This was precipitated in controlled manner with appropriate additives and was subsequently treated in an autoclave at T=270° C. and 80 bar for 5 h. The powder cake made in this way was subsequently freeze-dried.

The powder obtained was surface-modified in ethanol with trioxadecanoic acid. This was effected by adding 125 g of trioxadecanoic acid to 1,375 g of ethanol. Approximately 1 kg of doped $ZrO_2$ particles was dispersed therein. The whole suspension was subsequently homogenized for about 5 h under continuous grinding with $ZrO_2$ grinding balls. Surface-modified, doped $ZrO_2$ microparticles are obtained.

EXAMPLE 4

Preparation of PU-$ZrO_2$ Composite Sol with Undoped $ZrO_2$ Microparticles

To prepare PU-$ZrO_2$ composite sol with undoped $ZrO_2$ as insulation enamel, 300 g of undoped $ZrO_2$ sol from Example 2 were dispersed with stirring in approximately 1.7 kg of PU matrix enamel from Example 1. This sol was exposed to the influence of ultrasound to obtain better dispersal. The entire PU composite sol was homogenized further for 12 hours with stirring. In this way, a homogeneous PU composite sol containing homogeneously dispersed, undoped ZrO₂ was obtained, which was suitable for coating purposes.

EXAMPLE 5

Preparation of PU-ZrO₂ Composite Sol with Doped ZrO₂ Microparticles

To prepare PU-ZrO₂ composite sol with doped ZrO₂ as insulation enamel, a similar procedure was used as in Example 4: 300 g of doped ZrO₂ sol from Example 3 were dispersed in approximately 1.7 kg of PU matrix enamel from Example 1. This sol was exposed to the influence of ultrasound to obtain better dispersal. The entire PU composite sol was homogenized further for 12 hours with stirring. A homogeneous PU composite sol with homogeneously dispersed, doped ZrO₂ microparticles was obtained, which was suitable for coating purposes.

The invention claimed is:

1. A coating composition for electrical conductors, consisting of
    1-50 wt. % of microparticles with a selectively adjusted electronic defect structure in the crystal lattice, said defect structure making the valence electrons more easily polarizable, and
    an organic and/or organic-inorganic electrically-isolating polymeric matrix,
the microparticles with the selectively adjusted electronic defect structure being made up of zirconium dioxide in such manner that via doping with yttrium the basic crystal lattice is provided with vacancies which, by way of defect chemistry (defect structure), make it easier for the microparticles to be electronically polarized, wherein the yttrium doping is present in an amount of at least 0.5 mol. % and less than 8 mol. %; and
    wherein the organic and/or organic-inorganic matrix includes one or more polymerizable and/or hybrid binders;
    wherein the microparticles contain reactive surface groups adapted to the polymer-based and/or hybrid binders; and
    wherein said composition contains organically modified inorganic condensates.

2. The composition according to claim 1, wherein the reactive surface groups are selected from the group comprising metal acid esters, cyanate groups, urethane groups, epoxide groups, epoxy, carboxylic acid anhydride, C=C double bond systems, hydroxyl groups, alcohols bound by way of oxygen, esters, ethers, chelating agents, carboxyl groups, amino groups, ammonium and/or reactive resin components, the polymer-based binders containing acrylate groups, phenol groups, melamine groups, polyester-polyester imide groups, polysulfide groups, epoxide or polyamide groups, polyvinyl formal resins, aromatic compounds, aliphatic compounds, esters, ethers, alcoholates, fats or chelating agents.

3. The composition according to claim 1, wherein said composition contains one or more of the substances from the group consisting of additives, polymerization initiators, solvents, pigments and/or fillers.

4. The composition according to claim 1, wherein the average particle diameter of the microparticles with an electronic defect structure is 1-1,000 nm.

5. The composition according to claim 1, wherein said composition is transparent.

6. The composition according to claim 1, wherein said composition contains a fluorine compound.

7. The composition according to claim 1, wherein said composition contains a fluorinated silane, its pre-condensate or condensate.

8. A combination comprising an electrical conductor with
    the coating composition according to claim 1 applied to said electrical conductor.

9. A method for coating an electrical conductor comprising the steps of
    providing an electrical conductor, and
    applying to said electrical conductor the coating composition according to claim 1.

* * * * *